United States Patent Office 3,784,633
Patented Jan. 8, 1974

---

3,784,633
IMIDAZOLINYL-ETHYL-DITHIOCARBAMIC ACID ESTERS
Manfred Schorr, Frankfurt am Main, and Dieter Duwel, Hofheim, Taunus, Germany, assignors to Farbwerke Hoechst Aktiengesellschaft vormals Meister Lucius & Brüning, Frankfurt am Main, Germany
No Drawing. Filed May 16, 1972, Ser. No. 253,730
Claims priority, application Germany, May 18, 1971, P 21 24 572.7
Int. Cl. C07d 49/34
U.S. Cl. 260—309.6          5 Claims

ABSTRACT OF THE DISCLOSURE

Imidazolinyl-ethyl-dithiocarbamic acid esters and their physiologically compatible salts are described as well as the process of their manufacture and their anthelmintic action. The novel compounds correspond to Formula I

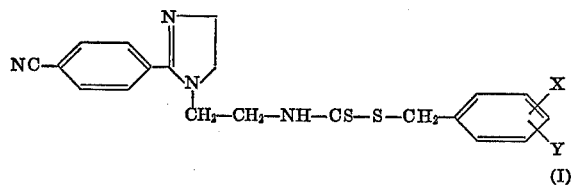

in which X and Y stands for hydrogen or halogen.

---

The present invention relates to imidazolinyl-ethyl-dithiocarbamic acid esters and their salts showing an anthelmintic action and to a process for their manufacture.

Various dithiocarbamic acid derivatives having a biological activity have already been disclosed, but no such compounds having a pronounced anthelmintic activity have as yet become known.

An object of this invention is to provide imidazolinyl-ethyl-dithiocarbamates of Formula I

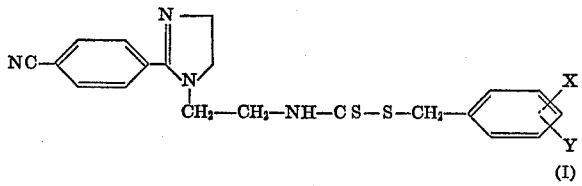

in which X and Y each stands for hydrogen or halogen, preferably chlorine or bromine.

The compounds of Formula I are prepared by reacting dithiocarbamic acid of Formula II

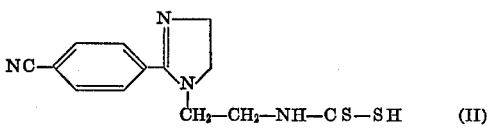

optionally in the form of a salt thereof with an inorganic or organic base, with a reactive ester of a benzyl alcohol of the Formula III

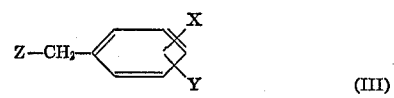

in which X and Y are defined as above and Z stands for a chlorine or bromine atom or the group R—SO$_2$—O—, wherein R is an aliphatic or aromatic hydrocarbon radical having up to 8 carbon atoms, preferably an aliphatic hydrocarbon radical having 1 to 4 carbon atoms, or an aromatic hydrocarbon radical having 6 or 7 carbon atoms.

2-[2-(4-cyanophenyl)-imidazolin-1-yl] - ethyl - dithiocarbamic acid of Formula II used as starting material is prepared by reacting 1-(2-aminoethyl)-2-(4-cyanophenyl)imidazoline with carbon disulfide. The reaction product is a yellow crystallized substance in the form of the inner salt. When the reaction is carried out in a suitable solvent, for example methanol, the salt precipitates in crystals which is isolated by filtration.

1-(2-aminoethyl)-2-(4-cyanophenyl) - imidazoline required for the above-cited reaction is obtained by reacting diethylene triamine with terephthalic acid dinitrile.

For the esterification of a dithiocarbamic acid of Formula II with an ester of a benzyl alcohol of Formula III according to the invention, it is generally not necessary to isolate 2-[2-(4-cyanophenyl)-imidazolin-1-yl]-ethyl-dithiocarbamic acid of Formula II in a pure state upon its preparation as indicated above, but it is advantageous further to react Compound II in the reaction mixture obtained by its preparation.

The esterification reaction according to the invention is advantageously carried out in a solvent or diluent, especially in a moderately polar solvent, such as an aliphatic alcohol having from 1 to 4 carbon atoms or a ketone having from 3 to 9 carbon atoms. In such a solvent, the dithiocarbamic acid II is often dissolved only in part. When, however, a reactive ester of a benzyl alcohol III is added, the acid is dissolved as the reaction proceeds.

The reaction is carried out at room temperature or at a moderately elevated temperature, the upper limit thereto being the boiling point of the solvent used. Generally, the salt of the imidazolinyl-ethyl-dithiocarbamic acid ester of Formula I with the acid, on which the benzyl alcohol ester of Formula III used is based, begins to separate after a short time already. Subsequently, the separated salt is isolated by filtration and, where required, purified by recrystallization.

When a dithiocarbamic acid of Formula II is used for the esterification according to the invention in the form of a salt thereof with the inorganic or organic base, the ester formed under these conditions is obtained in the form of the free base. It is advantageous, however, to isolate it also in the form of a salt obtained by adding an equivalent of a physiologically compatible acid, advantageously an inorganic acid, such as sulfuric acid, sulfamic acid, phosphoric acid, especially hydrochloric acid and hydrobromic acid, or an organic acid, such as acetic acid, propionic acid, succinic acid, maleic acid, malic acid, tartaric acid, citric acid as well as toluene-sulfonic acid, benzenesulfonic acid and methane-sulfonic acid.

The salts of the 2-[2-(4-cyanophenyl)-imidazolin-1-yl]-ethyl-dithiocarbamic acid benzyl ester I thus obtained are crystallized products which are valuable medicaments for combating worms, such as ascarides and oxyures, especially tapeworms to be found in human beings, carnivorous animals, such as cats and dogs, and ruminants, such as sheep and cattle.

The activity of the novel compounds of Formula I against tapeworms is especially pronounced. It is superior to that of 5-chlorosalicylic acid-2'-chloro-4'-nitro-anilide used as a tapeworm remedy, as can be seen from the following comparative tests.

The comparative tests were performed using 2-[2-(4-cyanophenyl)-imidazolin - 1 - yl] - ethyl-dithiocarbamic acid-3,4-dichloro-benzyl ester hydrochloride according to the invention, hereinafter referred to as Active Ingredient A. 2-[2-(4-cyanophenyl) - imidazolin-1-yl]-ethyl-dithiocarbamic acid-4-bromo-benzyl ester hydrobromide according to the invention, hereinafter referred to as Active Ingredient B, and 5-chloro-salicyclic acid-2'-chloro-4'-nitro-anilide, known from Arzneimittelforschg. 10 (1960), pages 881–889, hereinafter referred to as Comparative Substance.

The tests have been performed on animals which were infected by experiment in the laboratory. Mice were infected by administering to them per os a suspension of 100 ripe eggs of the mouse tapeworm Hymenolepis fraterna. Rats were infected each with 5 cysticercoids of the rat tapeworm Hymenolepis diminuta, isolated from Tribolium confusum. After termination of the prepatent period, the excrements of the animals were examined as to the progress of the infection. Each test was repeated at least three times on 6 mice per dose; the group of untreated control animals also comprised 6 mice. Of the rats, 4 animals were used per dose and the tests were also repeated at least three times; the group of untreated control animals consisted also of 4 rats.

The compounds to be tested were administered per os in one single dose as indicated below in a suspension of cellulose methyl ether. The activity was established by examination of the excrements or by autopsy of the tested animals on the seventh day after treatment. The following Tables 1 and 2 indicate as dosis curativa the amount of active ingredient which is sufficient entirely to eliminate the worms in the treated animals.

TABLE 1

Anthelmintic effects on Hymenolepis fraterna in albino mice

| Tested compound: | Dosis curativa minima in mg./kg. of body weight |
|---|---|
| Active Ingredient A | 1 x 100 |
| Active Ingredient B | 1 x 150 |
| Comparative substance | 1 x 250 to 300 |

TABLE 2

Anthelminitic effects on Hymenolepis diminuta in Wistar rats

| Tested compound: | Dosis curativa minima in mg./kg. of body weight |
|---|---|
| Active Ingredient A | 1 x 18 |
| Active Ingredient B | 1 x 15 |
| Comparative substance | 1 x 50 |

The above-cited Tables 1 and 2 clearly demonstrate the superiority of the active ingredients A and B according to the invention in comparison with the known comparative substance.

The imidazolinyl-ethyl-ditchiocarbamic acid esters of the invention and the salts thereof with physiologically acceptable acids may be administered as anthelmintics, especially against tapeworms, in the form of pharmaceutical compositions in admixture with usual carriers and adjuvants. The compounds of the invention may advantageously be applied as tablets or aqueous suspensions, for example with adjuvants, such as mucilage of cellulose methyl ester, and stabilizing additives, such as sodium citrate.

According to each individual case, the compounds of the invention are administered in dosage units of from 5 to 200 mg., preferably from 20 to 100 mg., one to three times a day each.

The following examples serve to illustrate the invention.

EXAMPLE 1

2-[2 - (4-cyanophenyl)-imidazolin-1-yl]-ethyl - dithiocarbamic acid-benzyl ester hydrobromide 28.7 g. of 1 - (2-aminoethyl)-2-(4-cyanophenyl)-imidazoline dihydrochloride were suspended in 150 ml. of methanol and 10.8 g. of sodium methylate were added while stirring. The mixture was stirred for 30 minutes at room temperature. Then sodium chloride was suction-filtered and the residue was washed with a small amount of methanol. 8.36 g. of carbon disulfide were added dropwise while stirring to the clear filtrate. The dithiocarbamic acid formed precipitated in crystals. After another 20 minutes 17.1 g. of benzyl bromide were added dropwise and the reaction mixture was stirred for 2 hours at room temperature. While the benzyl bromide was added dropwise the dithiocarbamic acid was entirely dissolved. About 10 minutes later, crystallization of the dithiocarbamate hydrobromide started. The precipitate was suction-filtered and washed with methanol and ether. 16 g. of 2-[2-(4-cyanophenyl)-imidazolin-1-yl] - ethyl-dithiocarbamic acid benzyl ester hydrobromide were obtained, melting point 243–245° C. (after recrystallization from methanol).

Analysis.—$C_{20}H_{20}N_4S_2 \cdot HBr$ (molecular weight: 461.4). Calculated: 12.2% of N, 13.9% of S. Found: 12.3% of N, 14.0% of S.

EXAMPLE 2

2 - [2 - (4-cyanophenyl)-imidazolin-1-yl]-ethyl-dithiocarbamic acid-3,4-dichlorobenzyl ester hydrochloride In the manner described in Example 1, 28.7 g. of 1-(2-amino-ethyl)-2-(4 - cyanophenyl) - imidazoline dihydrochloride were reacted with 10.8 g. of sodium methylate, 8.36 g. of carbon disulfide and 19.6 g. of 3,4-dichlorobenzyl chloride. After addition of 3,4-dichlorobenzyl chloride, the mixture was refluxed for 1 hour. After cooling of the reaction solution, the crystallized precipitate was suction-filtered and washed with methanol and ether. 25 g. of 2 - [2 - (4-cyanophenyl)-imidazolin-1-yl]-ethyl-dithiocarbamic acid-3,4-dichlorobenzyl ester hydrochloride were obtained, M.P. 234–236° C. (decomposition).

Analysis.—$C_{20}H_{18}Cl_2N_4S_2$—HCl (molecular weight: 485.8): Calculated: 11.6% of N, 13.2% of S, 21.9% of Cl. Found: 11.4% of N, 13.2% of S, 21.8% of Cl.

EXAMPLE 3

2 - [2 - (4-cyanophenyl)-imidazolin-1-yl]-ethyl-dithiocarbamic acid-4-bromobenzyl ester hydrobromide 30.6 g. of 1-(2-aminoethyl)-2 - (4 - cyanophenyl)-imidazoline dihydrochloride, 11.5 g. of sodium methylate and 150 ml. of methanol were stirred for 30 minutes at room temperature. The sodium chloride formed was then suction-filtered and washed with a small amount of methanol. 8.9 g. of carbon disulfide were added dropwise while stirring, within 5 minutes, to the clear filtrate. After another 30 minutes, 26.4 g. of 4-bromobenzyl bromide were introduced portionwise. The dithiocarbamic acid derivative which had precipitated in crystallized form entered slowly into solution. The reaction solution was then stirred for 2 hours at room temperature. After about 1 hour, crystallization of the end product began. The precipitate was suction-filtered and washed with methanol and ether. 36.9 g. of 2-[2-(4-cyanophenyl)-imidazolin-1-yl]-ethyl - dithiocarbamic acid-4-bromobenzyl ester hydrobromide were obtained, M.P. 227–229° C. (from methanol).

Analysis.—$C_{20}H_{18}N_4S_2 \cdot 2HBr$ (molecular weight: 540.3): calculated: 10.4% of N, 11.9% of S, 29.6% of Br. Found: 10.7% of N, 11.9% of S, 29.9% of Br.

What we claim is:

1. An imidazolinyl-ethyl-dithiocarbamic acid ester of Formula I

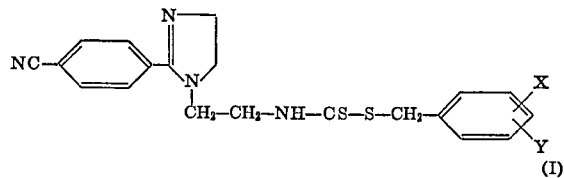

(I)

in which X and Y each represents hydrogen or halogen or a salt thereof with a physiologically compatible acid.

2. An imidazolinyl-ethyl-dithiocarbamate of Formula I, in which X and Y each represents chlorine or bromine, or a salt thereof with a physiologically compatible acid.

3. 2-[2-(4-cyanophenyl)-imidazolin-1-yl]-ethyl - dithiocarbamic acid benzyl ester hydrobromide.

4. 2-[2-(4-cyanophenyl)-imidazolin-1-yl]-ethyl - dithiocarbamic acid-3,4-dichlorobenzyl ester hydrochloride.

5. 2-[2-(4-cyanophenyl)-imidazolin-1-yl]-ethyl - dithiocarbamic acid-4-bromobenzyl ester hydrobromide.

(References on following page)

References Cited

UNITED STATES PATENTS

| | | | |
|---|---|---|---|
| 2,785,126 | 3/1957 | Scott et al. | 260—309.6 |
| 3,308,161 | 3/1967 | Shen | 260—309.6 |
| 3,658,834 | 4/1972 | Schorr et al. | 260—309.2 |
| 3,660,422 | 5/1972 | Schorr et al. | 260—309.2 |
| 2,376,424 | 5/1945 | Fell | 260—309 |

OTHER REFERENCES

Barltrop et al., Chem. Abst., vol. 50, columns 1384–2 (1956). QD1.A51 (Abstract of J. Chem. Soc. (London) 1956 reference).

Byk-Guldenwerke, Chem. Abst., vol. 33, column 6529 (1939). QD1.A51.

Hay et al., Chem. Abst., vol. 70, No. 47818h (1969). QD1.A51.

Reid et al., Chem. Berichte, vol. 93, pp. 751-3 (1960). QD1.D4.

NATALIE TROUSOF, Primary Examiner

U.S. Cl. X.R.

424—273